United States Patent
Karighattam et al.

(10) Patent No.: US 6,747,973 B1
(45) Date of Patent: Jun. 8, 2004

(54) RATE NEGOTIATION ALGORITHM

(75) Inventors: Kishore Karighattam, Sunnyvale, CA (US); Chien Meen Hwang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 246 days.

(21) Appl. No.: 10/053,809

(22) Filed: Jan. 18, 2002

(51) Int. Cl.⁷ .......................... H04L 12/28; H04L 12/56
(52) U.S. Cl. .................. 370/394; 370/465; 714/746
(58) Field of Search .................. 370/252, 394, 370/465, 470, 472, 476, 389, 392, 401, 351; 714/746

(56) References Cited

U.S. PATENT DOCUMENTS

| | | | |
|---|---|---|---|
| 2002/0018529 A1 * | 2/2002 | Dabak et al. | 375/267 |
| 2003/0043732 A1 * | 3/2003 | Walton et al. | 370/208 |
| 2003/0086371 A1 * | 5/2003 | Walton et al. | 370/235 |
| 2003/0095506 A1 * | 5/2003 | Jalali et al. | 370/252 |
| 2003/0112744 A1 * | 6/2003 | Baum et al. | 370/206 |
| 2003/0112880 A1 * | 6/2003 | Walton et al. | 375/260 |

FOREIGN PATENT DOCUMENTS

WO    WO0178489 A2    10/2001

OTHER PUBLICATIONS

A. Annamalai et al. "Analysis and Optimization of Adaptive Multicopy Transmission ARQ Protocols for Time–Varying Channels," *IEEE Transactions on Communications*, vol. 46, No. 10, Oct. 1998, pp. 1356–1368.

Edward H. Frank et al. "Connecting the Home with a Phone Line Network Chip set," *IEEE Micro*, Mar.–Apr. 2000, pp. 27–38.

* cited by examiner

*Primary Examiner*—Ajit Patel
(74) *Attorney, Agent, or Firm*—Winstead Sechrest & Minick P.C.

(57) ABSTRACT

A method for computer MSE to PE tables for rate negotiation has been disclosed. The method obtains probabilistic values for packet sizes in a network and obtains BER values for each FER based on these probabilistic values. An MSE for each PE is then calculated based on the BER values to obtain the upper limit tables. The MSE values in the upper limit tables is then decreased by 2 dB to obtain the lower limit tables. The MSE to PE tables may then be used for rate negotiation as set forth in the HPNA 2.0 specification.

10 Claims, 6 Drawing Sheets

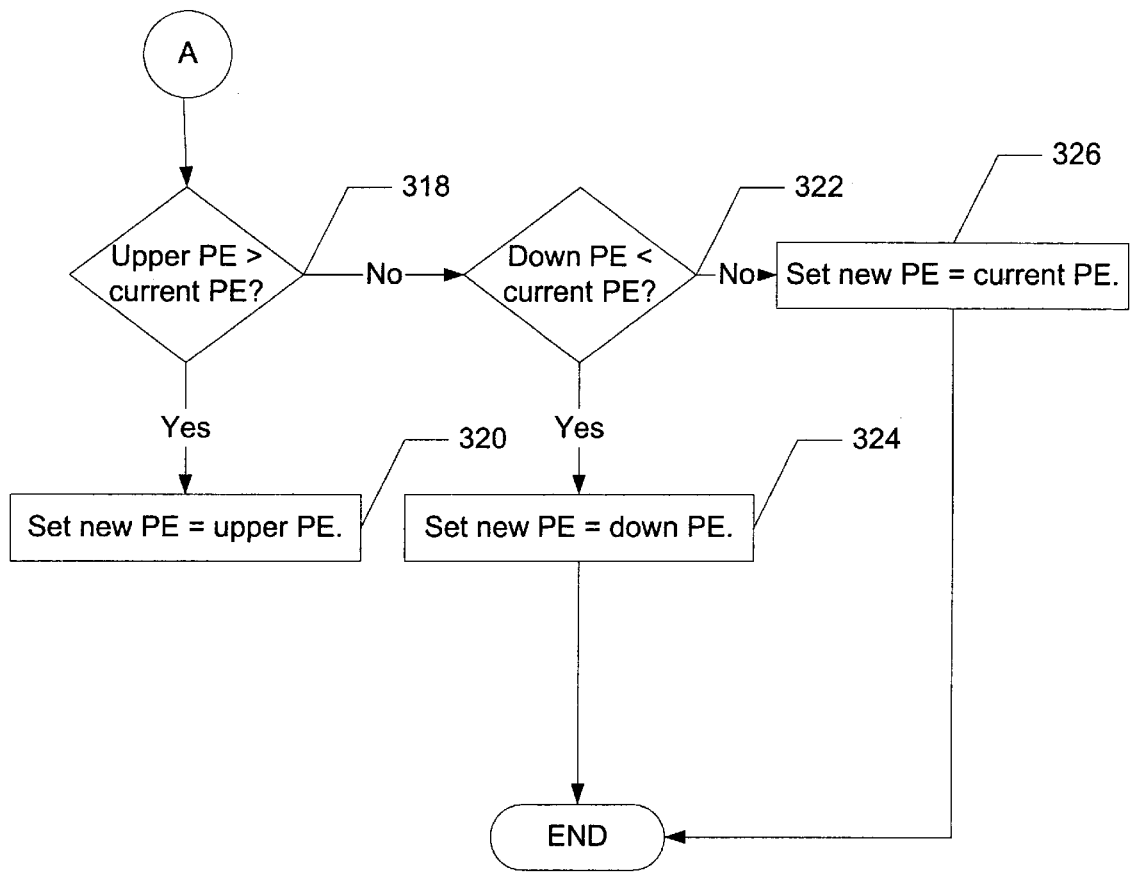
FIG. 3 (con't)
(Prior Art)

UP_LARQ — 502

| PE | MSE(dec) |
|---|---|
| 1 | 1612 |
| 2 | 229 |
| 3 | 179 |
| 4 | 98 |
| 5 | 33 |
| 6 | 19 |
| 7 | 7 |

DOWN_LARQ — 504

| PE | MSE(dec) |
|---|---|
| 1 | 1017 |
| 2 | 145 |
| 3 | 113 |
| 4 | 62 |
| 5 | 21 |
| 6 | 12 |
| 7 | 5 |

UP_NOLARQ — 506

| PE | MSE(dec) |
|---|---|
| 1 | 2438 |
| 2 | 328 |
| 3 | 271 |
| 4 | 147 |
| 5 | 50 |
| 6 | 29 |
| 7 | 11 |

DOWN_NOLARQ — 508

| PE | MSE(dec) |
|---|---|
| 1 | 1538 |
| 2 | 207 |
| 3 | 171 |
| 4 | 93 |
| 5 | 31 |
| 6 | 18 |
| 7 | 7 |

FIG. 5

RATE NEGOTIATION ALGORITHM

FIELD OF THE INVENTION

The present invention relates to data transmission in a network, and more particularly to the rate of data transmission in the network.

BACKGROUND OF THE INVENTION

Home networks are becoming more common and desirable for connecting computers within a home. One type of home network is the home phone line network which uses telephone lines typically installed in residential homes for communication between computers in the home. The Home Phone Line Networking Alliance (HPNA) has published a specification to standardize the behavior of home phone line networks. The current HPNA specification is version 2.0 ("HPNA 2.0").

FIG. 1 illustrates a home phone line network. The network comprises a control chip 100. The chip 100 further comprises a Media Independent Interface (MII) 106, a Media Access Control (MAC) 108, and a Physical Layer (PHY) 110. The chip 100 implements HPNA 2.0. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 112.

FIG. 2 illustrates a typical hardware-software interface for a home phone line network. The interface comprises a HPNA-compatible network interface controller (NIC) 206 which receives frames from the MAC 108. The NIC 206 sends the frame to a HPNA-compatible driver software 204 which is typically on a host computer. The driver software 204 then sends the frame to an upper layer software 202, such as the TCP/IP protocol stack. The TCP/IP protocol stack corresponds to the Windows™ network stack.

Because conditions on the phone lines vary, the HPNA 2.0 allows the data transmission rate between two stations in the network to be changed, according to the transmission error rate. If a data transmission rate is too fast for the line condition, then there can be a high level of errors in the frames received. 1f the data transmission rate is too slow for the line condition, then the data transmission rate is not optimized. The data transmission rate is determined by a payload encoding (PE). The PE is defined as the bit loading (bits/symbol) multiplied by the symbol rate (symbols/sec). The goal for HPNA 2.0 is to have a transmission error rate less than $10^{-4}$. This is referred to as "rate negotiation".

The HPNA 2.0 sets forth a sample rate negotiation algorithm. FIG. 3 is a flowchart illustrating a sample PE selection algorithm for rate negotiation according to HPNA 2.0.

First, a first table of mean square error (MSE) required for each PE to achieve a packet error rate (PER) of 1e-3 is compiled. This first table is defined as DOWN_LARQ. A second table is also compiled with a target PER of 1e-6. This second table is defined as DOWN_NOLARQ. A third table is defined as DOWN_LARQ. This third table has all ASMSE values in UP_LARQ but decreased by 2 dB. A fourth table is defined as DOWN_NOLARQ. This fourth table has all ASMSE values in UP_NOLARQ but decreased by 2 dB, via step 302. The Limited Automatic Repeat Request (LARQ) is an additional 8-bytes in a frame's header. The LARQ conveys link layer priority information and provides a negative acknowledgment protocol to increase the speed of frame retransmission.

Next, a history window of 16 HPNA 2.0 frames is maintained, via step 304. A MSE is computed for the frames in the history window that did not have a Cyclic Redundancy Check (CRC) error, via step 306.

If the use of LARQ is not enabled, then the UP_NOLARQ table is searched to find an upper PE with a MSE greater than or equal to the MSE for the window, via step 310. The DOWN_NOLARQ table is searched to find a down PE with a MSE greater than or equal to the MSE for the window, via step 312.

If the use of LARQ is enabled, then the UP_LARQ table is searched to find the upper PE with a MSE greater than or equal to the MSE for the window, via step 314. The DOWN_LARQ table is searched to find the down PE with a MSE greater than or equal to the MSE for the window, via step 316.

Next, if the upper PE is greater than the current PE, via step 318, then the new PE is set equal to the upper PE, via step 320. Otherwise, if the down PE is less than the current PE, via step 322, then the new PE is set equal to the down PE, via step 324. Otherwise, the current PE is maintained as the new PE, via step 326.

However, HPNA 2.0 does not specify how the values in the DOWN_LARQ, DOWN_NOLARQ, UP_LARQ, AND UP_NOLARQ are computed.

Accordingly, there exists a need for a method for computing MSE to PE tables for rate negotiation. The present invention addresses such a need.

SUMMARY OF THE INVENTION

A method for computer MSE to PE tables for rate negotiation has been disclosed. The method obtains probabilistic values for packet sizes in a network and obtains BER values for each FER based on these probabilistic values. An MSE for each PE is then calculated based on the BER values to obtain the upper limit tables. The MSE values in the upper limit tables is then decreased by 2 dB to obtain the lower limit tables. The MSE to PE tables may then be used for rate negotiation as set forth in the HPNA 2.0 specification.

BRIEF DESCRIPTION OF THE FIGURES

FIG. 5 illustrates preferred embodiments of MSE to PE tables generated by the preferred embodiment of the method for computing MSE to PE tables for rate negotiation in accordance with the present invention.

DETAILED DESCRIPTION

The present invention provides a method for computing MSE to PE tables for rate negotiation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 4 and 5 in conjunction with the discussion below.

An MSE must be computed for each PE for each rate negotiation table. An UP_LARQ and a DOWN_LARQ table must be created for the Frame Error Rate (FER) of 0.0001%. An UP_LARQ and a DOWN_LARQ table must be created for the FER of 0.1000%. The FER values are determined by the HPNA 2.0 specification.

Figure 1:
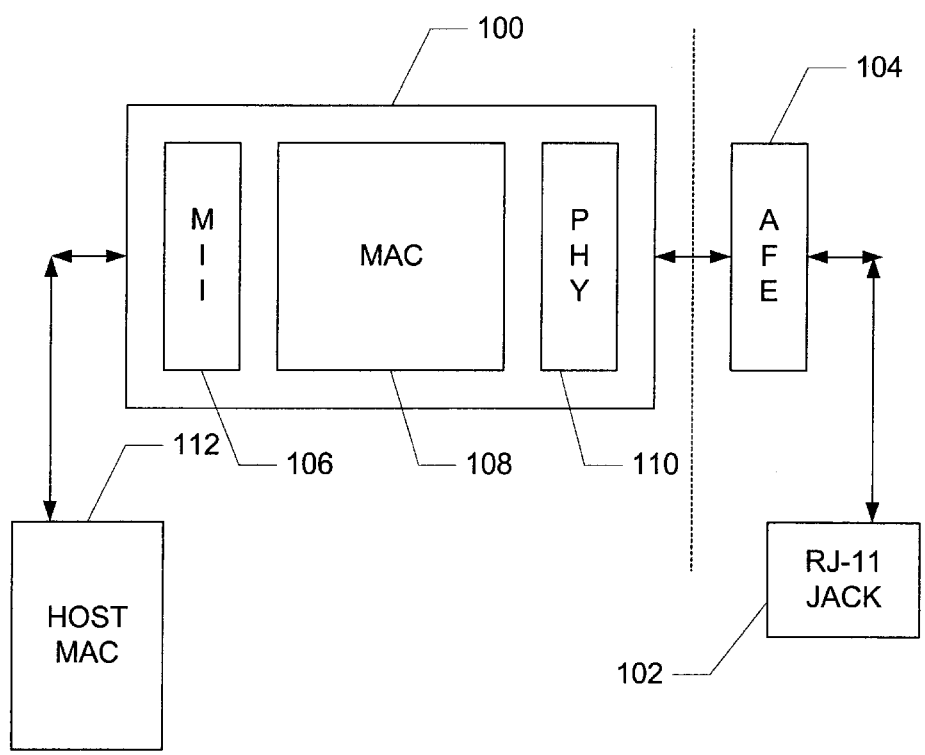
FIG. 1 illustrates a home phone line network.
Figure 2:
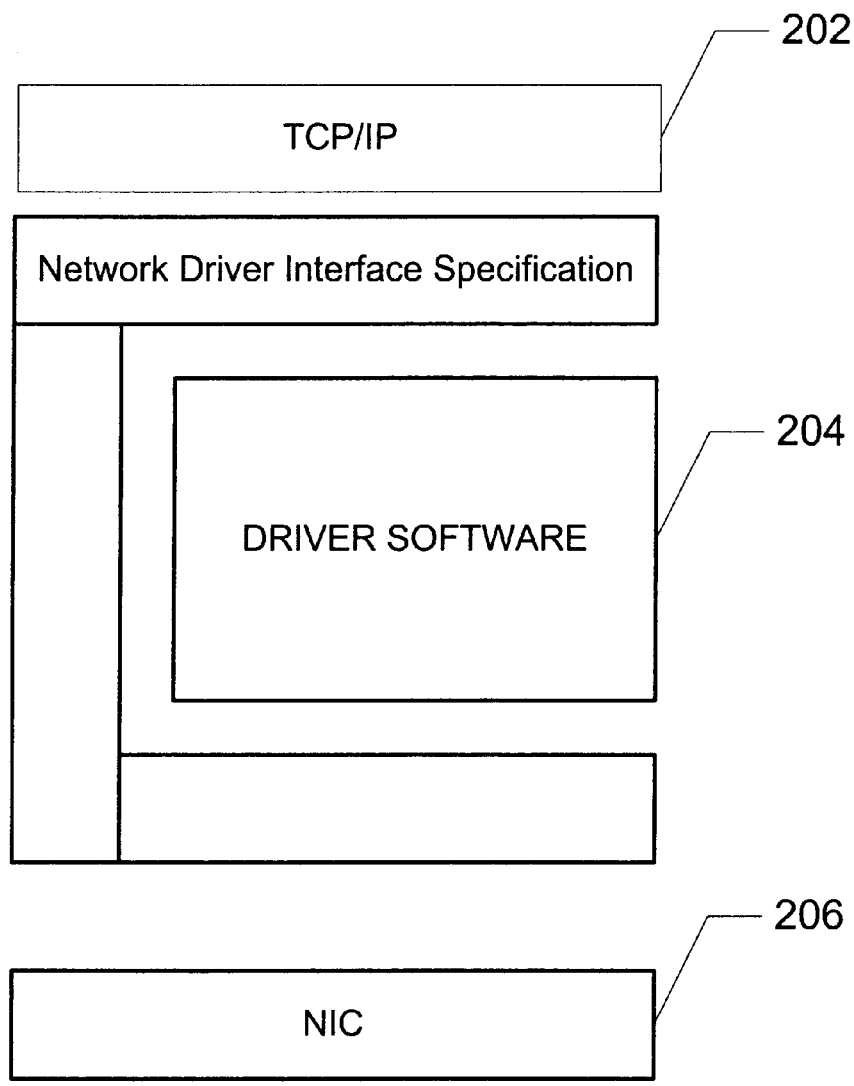
FIG. 2 illustrates a typical hardware-software interface for a home phone line network.
Figure 3:
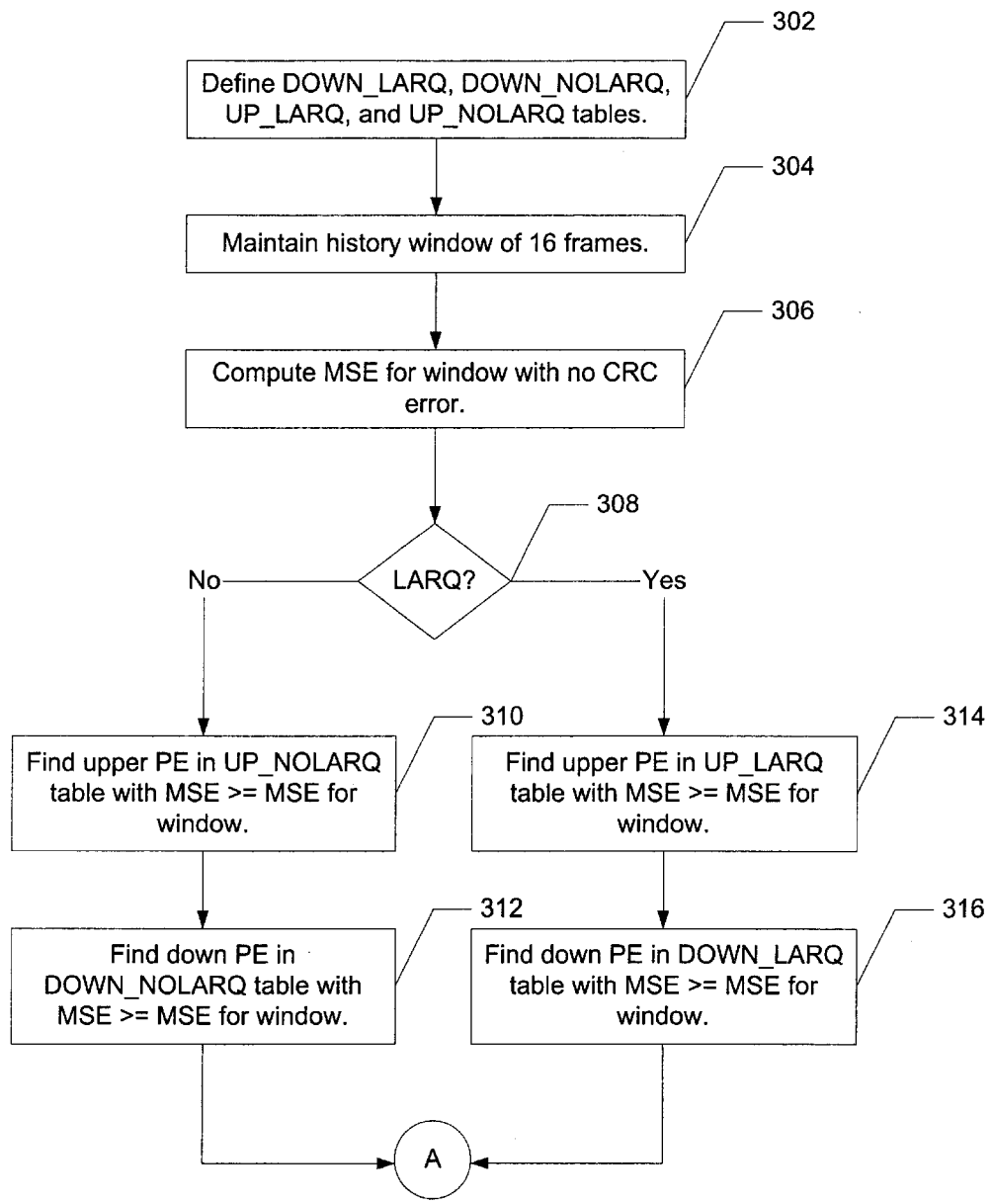
FIG. 3 is a flowchart illustrating a sample PE selection algorithm for rate negotiation according to HPNA 2.0.
Figure 4:
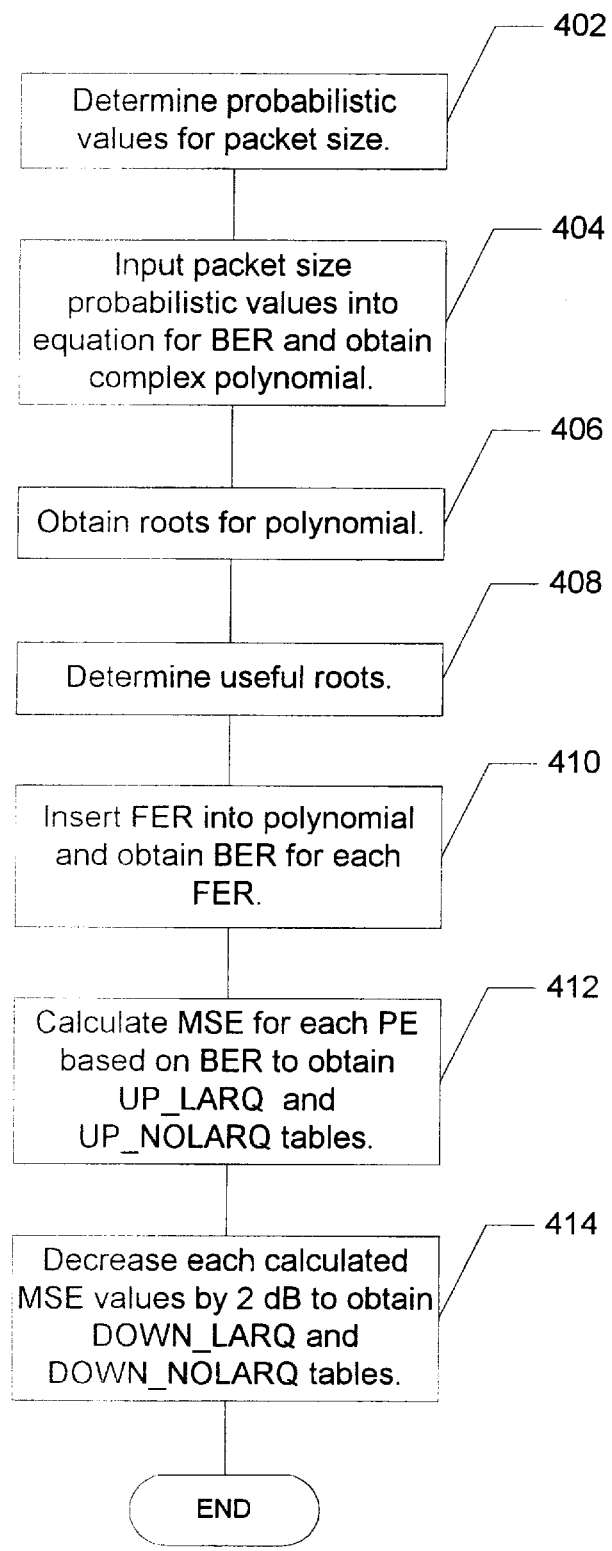
FIG. 4 is a flowchart illustrating a preferred embodiment of a method for computing mean square error (MSE) to payload encoding (PE) tables for rate negotiation in accordance with the present invention.

FIG. 4 is a flowchart illustrating a preferred embodiment of a method for computing mean square error (MSE) to payload encoding (PE) tables for rate negotiation in accordance with the present invention. In order to calculate the MSE's, the Bit Error Rate (BER) for a FER 0.0001% and 0.1000% must be known. The BER may be obtained from Equation (1) below:

$$BER = 1 - \frac{(10^{(\log(1-FER))})}{(\text{packet\_size} \times 8)} \quad (1)$$

However, the packet size is variable, depending upon the packet size distribution in the network. Thus, first, the probabilistic values for the packet size is determined, via step 402. In the preferred embodiment, the probabilistic values are obtained by running tests in an actual network and analyzing the frequency of each packet size. Table 1 below illustrates an example set of packet size probabilistic values:

TABLE 1

| PACKET SIZE (less than number of byte) | % OF TRAFFIC |
| --- | --- |
| 100 | 0.286 |
| 200 | 0.220 |
| 300 | 0.053 |
| 400 | 0.023 |
| 500 | 0.015 |
| 600 | 0.087 |
| 700 | 0.013 |
| 800 | 0.013 |
| 900 | 0.013 |
| 1000 | 0.023 |
| 1100 | 0.165 |
| 1200 | 0.001 |
| 1300 | 0.001 |
| 1400 | 0.002 |
| 1500 | 0.002 |
| 1600 | 0.083 |

The probabilistic values for the packet sizes are then input into Equation (1), via step 404. A complex polynomial results, as set forth in Equation (2):

$$(1-FER)=0.286\times((1-BER)^{(100\times 8)}+0.220\times((1-BER)^{(200\times 8)}+ \ldots +0.083\times((1-BER)^{(1600\times 8)}) \quad (2)$$

Next, the roots of Equation (2) are obtained, via step 406. The useful roots are then determined, via step 408. The useful roots are those roots which can physically exist. Next, the FER is inserted into the polynomial, via step 410. The FER is either 0.001 or 0.000001. Once the FER is inserted, BER becomes the only variable in Equation 2. The BER for FER=0.001 and the BER for FER=0.000001 are then obtained. For the probabilistic values in Table 1, for FER= 0.001, BER=2.83e−07, and for FER=0.000001, BER= 2.83e−10.

The MSE's corresponding to each PE can then be calculated, via step 412, using the Equation (3):

$$MSE=BER^2 \times PE \quad (3)$$

The results are an UP_LARQ table for the FER=0.001% and the BER=2.83e−10, and a UP_NOLARQ table for the FER=0.1000% and the BER=2.83e−07. Then, the MSE for each PE is decreased by 2 dB to obtain the DOWN_LARQ table and the DOWN_NOLARQ table, via step 414.

FIG. 5 illustrates preferred embodiments of MSE to PE tables generated by the preferred embodiment of the method for computing MSE to PE tables for rate negotiation in accordance with the present invention. The UP_LARQ table 502, DOWN_LARQ table 504, UP_NOLARQ table 506, and DOWN_NOLARQ table 508 each comprise the PE values and their corresponding MSE values.

For example, the PHY 110 receives frames with a current PE and calculates the error for each frame. The error values are sent to the upper layer driver software 204 as part of a frame status frame (FSF). The FSF is another packet sent immediately after each data packet and contains certain status information required by subsequent processes. The upper layer driver software 204 calculates the MSE for the 16 frame window, via step 304. For example, assume that the current PE is 4, and the MSE for the window is 150.

If the use of the LARQ is not enabled, via step 308, then the upper layer software 204 searches the UP_NOLARQ table 506 to find an upper PE with a MSE that is greater than or equal to 150, via step 310. In this example, the upper PE is 3. The upper layer software 204 then searches the DOWN_NOLARQ table 508 to find a down PE with a MSE that is greater than or equal to 150, via step 312. In this example, the down PE is 3. Since the upper PE of 3 is not greater than the current PE of 4, via step 318, and the down PE of 3 is less than the current PE of 4, via step 322, then the new PE is set to 3, via step 324.

If the use of the LARQ is enabled, via step 308, then the upper layer software 204 searches the UP_LARQ table 502 to find an upper PE with a MSE that is greater than or equal to 150, via step 314. In this example, the upper PE is 3. The upper layer software 204 then searches the DOWN_LARQ table 504 to find a down PE with a MSE that is greater than or equal to 150, via step 316. In this example, the down PE is 1. Since the upper PE of 3 is not greater than the current PE of 4, via step 318, and the down PE of 1 is less than the current PE of 4, via step 322, then the new PE is set to 1, via step 324.

In the preferred embodiment, the tables 502–508 are implemented as Look-Up Tables (LUT). However, other implementations are possible without departing from the spirit and scope of the present invention.

A method for computer MSE to PE tables for rate negotiation has been disclosed. The method obtains probabilistic values for packet sizes in a network and obtains BER values for each FER based on these probabilistic values. An MSE for each PE is then calculated based on the BER values to obtain the upper limit tables. The MSE values in the upper limit tables is then decreased by 2 dB to obtain the lower limit tables. The MSE to PE tables may then be used for rate negotiation as set forth in the HPNA 2.0 specification.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for obtaining mean square error (MSE) to payload encoding (PE) values for a home phone line network, comprising the steps of:
   (a) determining a plurality of probabilistic values for a plurality of packet sizes;
   (b) inputting the plurality of probabilistic values into an equation for a bit error rate (BER), wherein the inputting results in a polynomial;
   (c) obtain a plurality of roots for the polynomial;
   (d) determine useful roots for the plurality of roots;
   (e) inserting a frame error rate (FER) into the polynomial;
   (f) obtaining the BER for the inserted FER; and
   (g) calculating the MSE for each PE value based on the BER, wherein the determining step (a) comprises:
       (a1) perform tests in the network to measure frequencies of packet sizes; and
       (a2) determine the plurality of probabilistic values for each packet size.

2. The method of claim 1, wherein the inserting step (e) comprises:
   (e1) inserting a first FER into the polynomial; and
   (e2) inserting a second FER into the polynomial, wherein the first and second values are specified by a Home Phone Line Networking Alliance (HPNA) specification.

3. The method of claim 2, wherein the obtaining step (f) comprises:
   (f1) obtaining a first BER for the first BER; and
   (f2) obtaining a second BER for the second FER.

4. The method of claim 3, wherein the calculating step (g) comprises:
   (g1) calculating the MSE for each PE value based on the first BER to obtain a first upper limit table; and
   (g2) calculating the MSE for each PE value based on the second BER to obtain a second upper limit table.

5. The method of claim 4, wherein the first upper limit table is a UP_LARQ table and the second upper limit table is a UP_NOLARQ table according to the HPNA specification.

6. The method of claim 4, further comprising:
   (g3) obtaining a first lower limit table by decreasing the MSE for each PE value for the first upper limit table by approximately 2 dB; and
   (g4) obtaining a second lower limit table by decreasing the MSE for each PE value for the second upper limit table by approximately 2 dB.

7. The method of claim 6, wherein the first lower limit table is a DOWN_LARQ table and the second lower limit table is a DOWN_NOLARQ table according to the HPNA specification.

8. A method for obtaining MSE to PE values for a home phone line network, comprising the steps of:
   (a) determining a plurality of probabilistic values for a plurality of packet sizes;
   (b) inputting the plurality of probabilistic values into an equation for a BER, wherein the inputting results in a polynomial;
   (c) obtain a plurality of roots for the polynomial;
   (d) determine useful roots for the plurality of roots;
   (e) inserting a first FER into the polynomial;
   (f) inserting a second FER into the polynomial, wherein the first and second values are specified by a HPNA specification;
   (g) obtaining a first BER for the first FER;
   (h) obtaining a second BER for the second FER;
   (i) calculating the MSE for each PE value based on the first BER to obtain a first upper limit table;
   (j) calculating the MSE for each PE value based on the second BER to obtain a second upper limit table;
   (k) obtaining a first lower limit table by decreasing the MSE for each PE value for the first upper limit table by approximately 2 dB; and
   (l) obtaining a second lower limit table by decreasing the MSE for each PE value for the second upper limit table by approximately 2 dB, wherein the determining step (a) comprises:
       (a1) perform tests in the network to measure frequencies of packet sizes; and
       (a2) determine the plurality of probabilistic values for each packet size.

9. The method of claim 8, wherein the first upper limit table is a UP_LARQ table and the second upper limit table is a UP_NOLARQ table according to the HPNA specification.

10. The method of claim 8, wherein the first lower limit table is a DOWN_LARQ table and the second lower limit table is a DOWN_NOLARQ table according to the HPNA specification.

* * * * *